US008560113B2

(12) United States Patent
Diehl et al.

(10) Patent No.: US 8,560,113 B2
(45) Date of Patent: Oct. 15, 2013

(54) METHOD OF MILLING AN INTERIOR REGION

(75) Inventors: Alan Diehl, Westlake Village, CA (US); Robert B. Patterson, Bellevue, WA (US)

(73) Assignee: Truemill, Inc., Thousand Oaks, CA (US)

(*) Notice: Subject to any disclaimer, the term of this patent is extended or adjusted under 35 U.S.C. 154(b) by 144 days.

(21) Appl. No.: 13/084,712

(22) Filed: Apr. 12, 2011

(65) Prior Publication Data

US 2011/0251715 A1    Oct. 13, 2011

Related U.S. Application Data

(60) Provisional application No. 61/323,397, filed on Apr. 13, 2010.

(51) Int. Cl.
*G06F 19/00*   (2011.01)

(52) U.S. Cl.
USPC ............................ 700/191; 345/420; 409/132

(58) Field of Classification Search
USPC ............ 700/173, 190, 191; 345/420; 409/132
See application file for complete search history.

(56) References Cited

U.S. PATENT DOCUMENTS

| | | | |
|---|---|---|---|
| 7,451,013 B2 | 11/2008 | Coleman et al. | |
| 7,491,021 B2* | 2/2009 | Kozlowski | 409/132 |
| 7,577,490 B2 | 8/2009 | Diehl et al. | |
| 7,831,332 B2 | 11/2010 | Diehl | |
| 8,295,972 B2* | 10/2012 | Coleman et al. | 700/186 |
| 2002/0129485 A1* | 9/2002 | Mok et al. | 29/527.2 |
| 2003/0214503 A1* | 11/2003 | Venkataraman et al. | 345/420 |
| 2010/0087949 A1* | 4/2010 | Coleman et al. | 700/189 |
| 2010/0165134 A1* | 7/2010 | Dowski et al. | 348/218.1 |

* cited by examiner

*Primary Examiner* — Mohammad Ali
*Assistant Examiner* — Anthony Whittington
(74) *Attorney, Agent, or Firm* — Panitch Schwarze Belisario & Nadel LLP (57) ABSTRACT

A method is disclosed for generating a tool path for milling a region of a workpiece having first, second and third sides. The method includes: generating a first arc having a corresponding in-process material boundary intersecting the first side and which is tangent to the second side and to the third side; generating a succession of one or more second arcs, having a corresponding in-process material boundary which intersects the first side, is parallel to the first arc, and progresses by a corresponding first predetermined value from the first arc toward the first side until the in-process material boundary corresponding to one of the second arcs has a maximum distance from the first side less than the first predetermined value; and thereafter generating a succession of transition passes connecting each one of the second arcs end to end with the first arc to form the tool path.

21 Claims, 7 Drawing Sheets

METHOD OF MILLING AN INTERIOR REGION

CROSS-REFERENCE TO RELATED APPLICATIONS

This application claims the benefit of U.S. Provisional Application No. 61/323,397, filed Apr. 13, 2010, the contents of which are incorporated herein by reference in their entirety.

BACKGROUND OF THE INVENTION

1. Field of the Invention

This invention relates to computer aided manufacturing and more specifically to a method and apparatus for generating a computer numerical control program for controlling a numerical control machine.

2. Background Information

In milling a workpiece using a numerical control (NC) machine, it is desirable to remove material from the workpiece as fast as possible consistent with long tool life.

Methods for achieving a fast material removal rate simultaneously with long tool life are described in U.S. Pat. No. 7,451,013, the contents of which are incorporated herein by reference in their entirety. The methods described in U.S. Pat. No. 7,451,013 remove material in multiple intermediate phases, each phase employing a particular type of tool path which is most suitable for the shape of the material to be removed. As a consequence of the aforementioned material removal methods, each intermediate phase leaves one or more regions of the workpiece to be removed in a subsequent intermediate phase until the final finish phase is completed.

Figure 1:
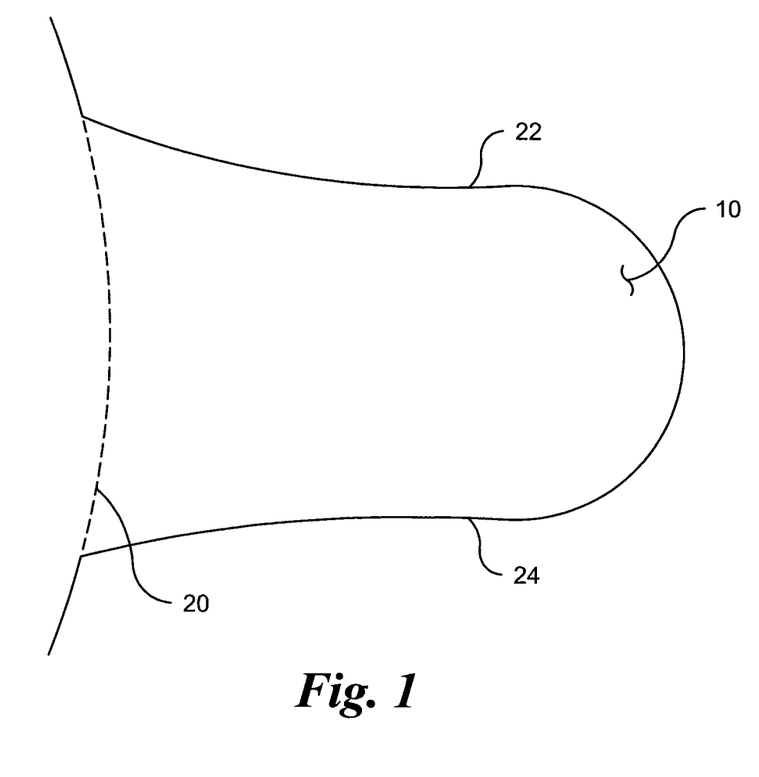
FIG. 1 is an illustration of an interior region of a workpiece from which material has not been removed by a milling operation.

FIG. 1 is an illustration of a general case where material to be removed from a workpiece has been left in an interior region of the workpiece at the completion of an intermediate phase of milling. The region can be characterized as having three sides, a first side which can be a part boundary, i.e., a workpiece boundary existing at the beginning of the milling operation or a boundary to be attained at the completion of the milling operation, or an in-process material boundary, i.e., a boundary of the workpiece established by an intermediate milling operation, and second and third sides which may be either part boundaries or in-process material boundaries. An inside corner of a pocket is typical of the type of region left to be milled from a previous intermediate phase. Such a region would be characterized, for example, as having an in-process material boundary for a first side, and part boundaries for the second and third sides.

Figure 2:
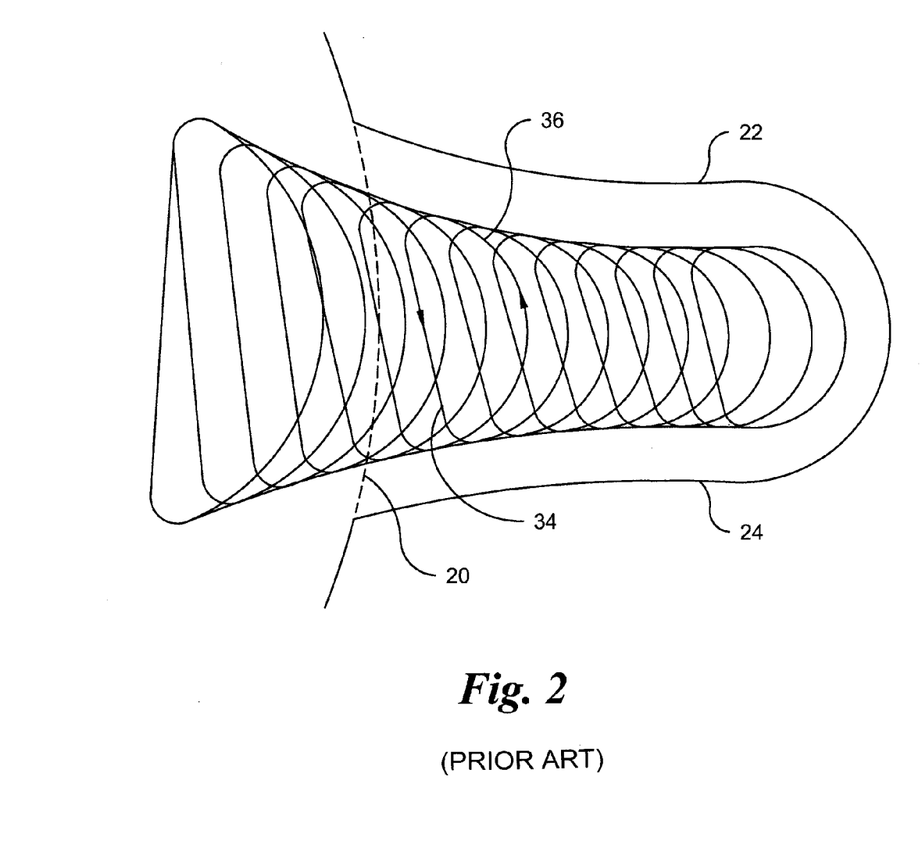
FIG. 2 is an illustration of a prior art tool path for removing the material from the region shown in FIG. 1.

FIG. 2 illustrates a tool path for milling the region of FIG. 1 by one of the methods described in U.S. Pat. No. 7,451,013. In this method, the tool path for milling the region consists of a series of circularly shaped tool passes that successively advance into the region from the first side, removing material with tool passes that traverse between the third side and the second side; and transition passes, which do not remove material, that return the milling cutter from the second side to the third side after each material removing pass in preparation for the next material removing tool pass.

While such a tool path is desirable from the point of view of tool life, a drawback to the foregoing method is that the length of each transition pass required to return the tool from each material removing tool pass to a location from which the following removal tool pass can begin is approximately equal to the length of the tool pass which cuts metal. Because such transition passes do not remove material, the material removal efficiency of this method is limited in that only about half of the total length of the tool path is used to remove material.

In consideration of the above, it would be desirable to have a tool path for milling a region of a workpiece which has shorter transition, i.e., non-material removing passes.

BRIEF SUMMARY OF THE INVENTION

The present invention is an automated method for generating a tool path for milling a region of a workpiece with a milling cutter. The region comprises a first side, a second side and a third side. The method comprises the steps of: generating with a processor a first arc having a corresponding in-process material boundary which intersects the first side and which is tangent to the second side and to the third side; generating with a processor a succession of one or more second arcs, each one of which being characterized by: (1) having a corresponding in-process material boundary which intersects the first side, (2) being parallel to the first arc, and (3) progressing by a corresponding first predetermined value from the first arc toward the first side until the in-process material boundary corresponding to one of the second arcs has a maximum distance from the first side less than the first predetermined value; and thereafter, generating with a processor a succession of transition passes connecting each one of the second arcs end to end with the first arc to form the tool path.

Another aspect of the invention is a non-transitory computer readable storage medium having an executable program stored thereon, wherein the program instructs a computer to generate a tool path for milling a region of a workpiece with a milling cutter. The region comprising a first side, a second side and a third side. The method comprises the steps of: generating with a processor a first arc having a corresponding in-process material boundary which intersects the first side and which is tangent to the second side and to the third side; generating with a processor a succession of one or more second arcs, each one of which being characterized by: (1) having a corresponding in-process material boundary which intersects the first side, (2) being parallel to the first arc, and (3) progressing by a corresponding first predetermined value from the first arc toward the first side until the in-process material boundary corresponding to one of the second arcs has a maximum distance from the first side less than the first predetermined value; and thereafter generating with a processor a succession of transition passes connecting each one of the second arcs end to end with the first arc to form the tool path.

A further aspect of the invention is a machine for generating a tool path for milling a region of a workpiece with a milling cutter, the region comprising a first side, a second side and a third side. The machine, comprises a computer coupled to a memory, wherein the computer is programmed to generate the tool path by the steps of: generating with a processor a first arc having a corresponding in-process material boundary which intersects the first side and which is tangent to the second side and to the third side; generating with a processor a succession of one or more second arcs, each one of which being characterized by: (1) having a corresponding in-process material boundary which intersects the first side, (2) being parallel to the first arc, and (3) progressing by a corresponding first predetermined value from the first arc toward the first side until the in-process material boundary corresponding to one of the second arcs has a maximum distance from the first side less than the first predetermined value; and thereafter generating with a processor a succession of transition passes connecting each one of the second arcs end to end with the first arc to form the tool path.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the figure and designated parts thereof. Unless specifically set forth herein, the terms "a", "an" and "the" are not limited to one element but instead should be read as meaning "at least one". The terminology includes the words noted above, derivatives thereof and words of similar import.

Definitions:

The following definitions are to be applied to terminology used in the application:

Arc—a curved line or a number of connected line segments approximating the shape of a curved line.

CAM program—a computer program used for generating the points of a tool path.

Circular arc—the set of all points equidistant from a fixed point called the center, i.e., a portion of a circle.

CNC program—A computer program that receives the output of a CAM program to generate a set of instructions, i.e., control code, defining machining conditions and movements of a tool mounted in a numerical control machine relative to a workpiece mounted in the numerical control machine.

In-process material boundary—a boundary of the workpiece established by an intermediate milling operation. The in-process material boundary is always offset from the tool path by the radius of the milling cutter.

Line—a straight, one dimensional figure having no thickness and extending infinitely.

Line segment—a closed interval corresponding to a finite portion of an infinite line.

Milling cutter (tool)—a cutter which rotates about a rotational axis including, but not limited to, end mills, face mills, shell mills, slab mills, plunge mills, single angle cutters, dovetail cutters, keyseat cutters, T-slot cutters, concave and convex cutters and gear hob cutters.

Part boundary—a workpiece boundary existing at the beginning of a milling operation or a boundary to be attained at the completion of the milling operation.

Radial depth of cut—the amount of material removed in the radial direction of the milling cutter.

Stepover (or stepover value)—the distance normal to a tool path between a first tool pass and a substantially parallel second tool pass.

Engagement (tool engagement)—The surface of contact between the surface of the tool and the workpiece at the in-process material boundary, frequently expressed as an angle.

Tool pass—a portion of the tool path for which the milling cutter is in contact with the workpiece.

Tool path—the path of the rotational axis of the milling cutter.

Transition pass—a portion of the tool path for which the milling cutter is not in contact with the workpiece.

Referring now to FIG. 1, there is shown a region 10 of a workpiece, (hereafter region 10), from which material is to be removed by a milling cutter 12. The region 10 may be characterized as having a first side, 20, a second side 22 and third side 24. The first side 20 may be a part boundary, that is, for instance, an edge of the workpiece, or an in-process material boundary, i.e., a boundary formed by a previous intermediate milling operation. The second side 22 and the third side 24 of the region shown in FIG. 1 are part boundaries, that is, boundaries to be attained at the completion of milling the region 10.

FIG. 2 shows a tool path 14 for milling the region 10 of FIG. 1 by one of the methods described in U.S. Pat. No. 7,451,013. In this method, the tool path 14 for milling the region 10 consists of a series of circular tool passes 36 that successively advance into the region from the first side 20, removing material with tool passes 36 that traverse between the third side 24 and the second side 22; and transition passes 34, which do not remove material, that return the milling cutter 12 from the second side 22 to the third side 24 after each material removing tool pass 36, in preparation for the next material removal tool pass 36. In FIG. 2, the portions of the tool path 14 which are substantially circular are tool passes 36, and the portions of the tool path 14 which are substantially straight are transition passes 34.

Figure 3:
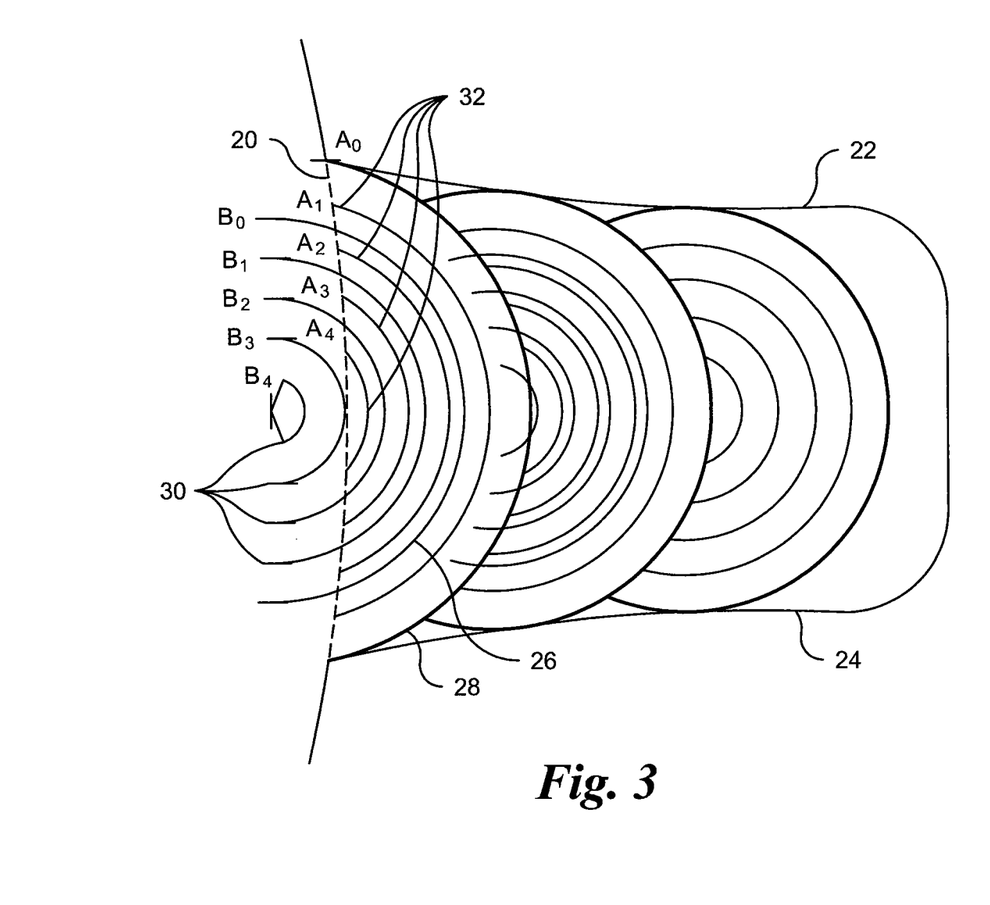
FIG. 3 is a diagram illustrating three sets of first and second arcs and corresponding in-process material boundaries, generated according to a preferred embodiment of the present invention.

FIG. 3 illustrates steps in forming a tool path 14 (see FIG. 5) for removing material from the region 10 by the milling cutter 12 according to a preferred embodiment of the invention. The tool path 14 is formed by generating a first arc 26 and a succession of second arcs 30, which are then connected end-to end by transition passes 34 (not shown in FIG. 3). The first arc 26 (labeled Bo in FIG. 3) has a corresponding in-process material boundary 28 (labeled Ao in FIG. 3), which: (1) is offset from the first arc 26 by the radius of the milling cutter 12, (2) is tangent to the second side 22 and to the third side 24, and (3) intersects the first side 20 at its ends. Following the generation of the first arc 26, a succession of second arcs 30 (labeled B1-B4 in FIG. 3) are formed parallel to the first arc 26. Each second arc 30 has a corresponding in-process material boundary 32 (labeled A1-A4 in FIG. 3), which intersects the first side 20 at its ends. Each one of the succession of second arcs 30 progresses toward the first side 20 by a corresponding stepover until one of the second arcs 30 is located such that a maximum distance from the first side 20 to the in-process material boundary 32 (A4 in FIG. 3) corresponding to the one of the second arcs 30 is less than the stepover of the corresponding second arc 30 and greater than a predetermined value.

In the preferred embodiment, the preferred shape of the first arc 26 is circular. Accordingly, the shape of each of the second arcs 30 is circular. However, the shape of the first arc 26 need not be circular, but could be any shape which contains all of the line segments connecting any pair of points within a portion of the region 10 enclosed by the first arc 26 and the first side 20, i.e., a region where the points within the region form a convex set, and the first in-process material boundary 28 corresponding the first arc 26 is tangent to the second side 22 and to the third side 24, and intersects the first side 20 at its ends. For example, the first arc 26 could be conical in shape.

The stepover is a determining factor for how rapidly material can be removed from a workpiece. The larger the stepover, the more material that is removed in a given tool pass. However, the size of the stepover cannot be made too large without damaging the milling cutter 12 or introducing vibration or other deleterious effects into the milling operation. Some factors that influence the size of the stepover include the geometry of the region 10 to be milled, the shape of the second arcs 30, the type of material to be milled, the type and size of the milling cutter 12, and whether the milling is climb or conventional milling.

Preferably, the size of the stepover corresponding to each one of the second arcs 30 is constant. However, in the present invention, the size of the stepover corresponding to each one of the second arcs 30 may be non-constant. For example, the size of the stepover corresponding to each one of the second arcs 30 may be determined by a formula or by table lookup, based on, for example, the shape of each individual second arc 30. Also, the stepover corresponding to each one of the second arcs may be based on criteria such as maintaining the engagement of the milling cutter 12 to be constant or to be within a certain range. The value(s) of the stepover could be determined automatically or alternatively, the judgment of an operator could set the value(s) of the stepover.

In the preferred embodiment, when the maximum distance of the in-process material boundary 32 closest to the first side 20 is greater than the stepover of the corresponding second arc 30, it is an indication that a further second arc 30 should be generated to complete a set of arcs 26, 30. Conversely, if the maximum distance of the in-process material boundary 32 closest to the first side 20 is less than or equal to the stepover of the corresponding second arc 30, but is greater than a predetermined threshold, the second arc 30 is set to be the final second arc 30 of the set. If the maximum distance of the in-process material boundary 32 closest to the first side 20 is less than the predetermined value, for example, a radius of the milling cutter 12, it is an indication that the material to be removed by the tool pass 36 corresponding to the in-process material boundary 32 closest to the first side 20 would be insubstantial. In that case, the second arc 30 closest to the first side 20 is preferably deleted and the previously generated second arc 30 is used as the second arc 30 closest to the first side 20.

As shown in FIG. 3, multiple sets of a first arc 26 and second arcs 30 may be generated when the depth of the region 10 is such that the location of the first arc 26 results in a first set of arcs 26, 30 which fails to remove the desired amount of material from the region 10. Preferably, the multiple sets would be generated in order, starting from the first side 20 and could have values of stepover unique to each set. In the case of generating multiple sets, the in-process material boundary 28 corresponding to the first arc 26 of a previously determined set is used as a starting side, i.e., first side 20, for each subsequent set.

Figure 4A:
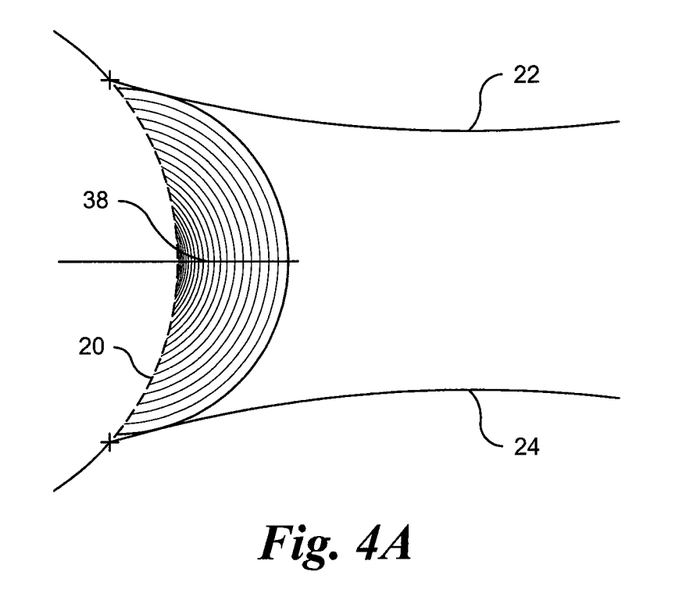
FIG. 4A illustrates a set of first and second arcs in which the value of the stepover falls below a predetermined threshold.
Figure 4B:
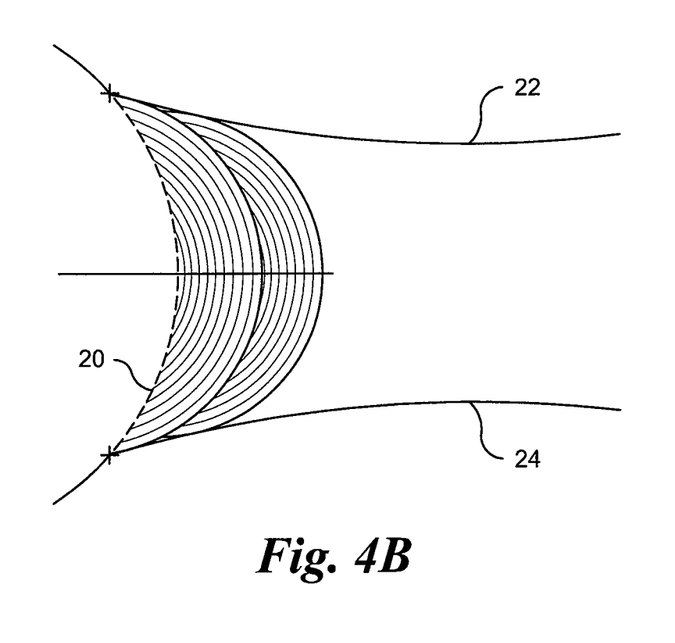
FIG. 4B illustrates converting the set of arcs shown in FIG. 4A to two sets.

As shown in FIGS. 4A and 4B, a second set of arcs 26, 30 may also be generated when, for the case of a non-constant stepover, the value of the stepover, or the engagement, falls below a second predetermined threshold prior to the maximum distance of the in-process material boundary 32 closest to the first side 20 being less than a predetermined value of stepover. For example, the predetermined value of the stepover may be set to 50% of the largest stepover. In that case, the generation of the first set is terminated at a point 38, and a second set of arcs 26, 30 is generated using the in-process material boundary 28 corresponding to the first arc 26 of the first set as a starting side for the second set.

Figure 5:
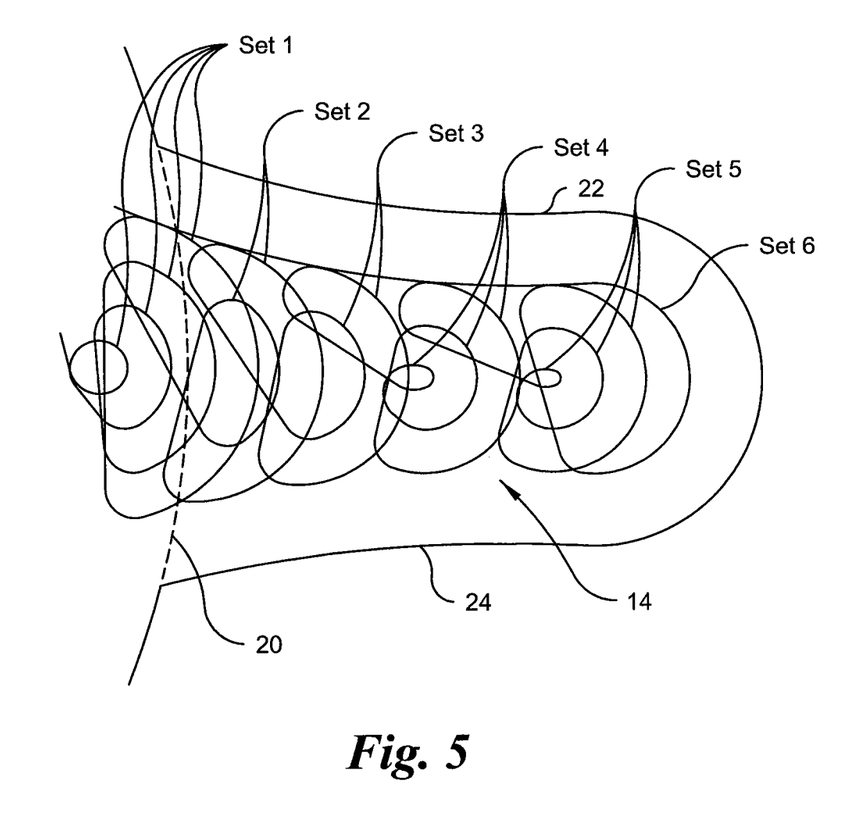
FIG. 5 is a diagram illustrating an example tool path in accordance with the preferred embodiment of the present invention.

FIG. 5 illustrates an example of a tool path 14 for the case of 6 sets, formed in accordance with the preferred embodiment of the invention.

Figure 6A:
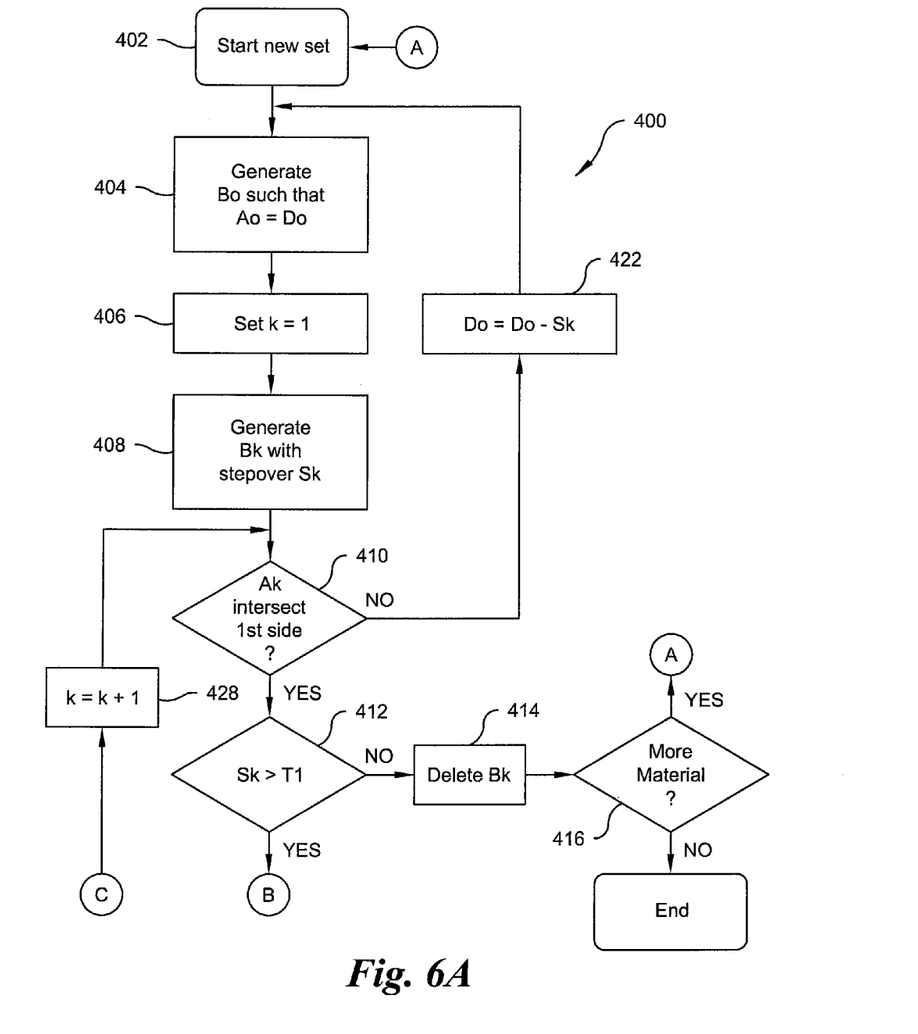
FIGS. 6A and 6B, taken together, is a flowchart showing a process for generating a set of first and second arcs according to the preferred embodiment of the present invention.
Figure 6B:
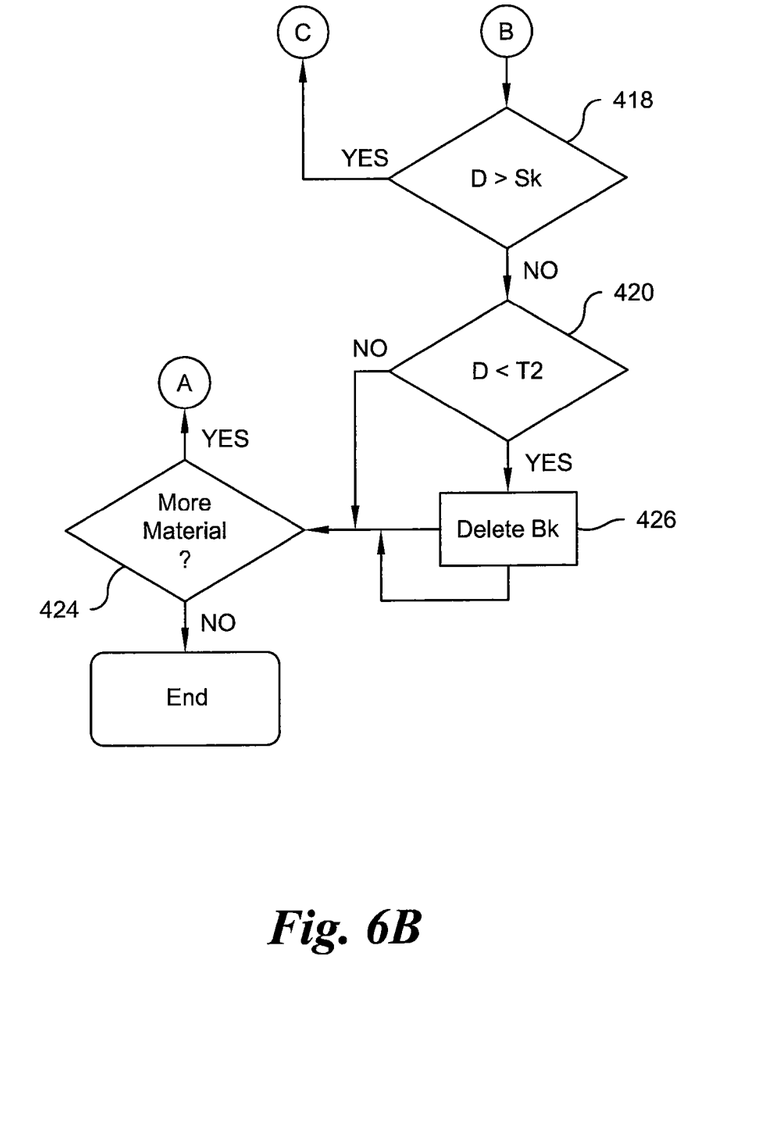

FIGS. 6A and 6B, taken together, is a flowchart of a preferred process 400 for determining the parameters of the first arc 26 and the succession of second arcs 30, for one set of one or more sets of arcs 26, 30 for generating a tool path 14 in accordance with the preferred embodiment. At step 402, the radius of the milling cutter 12 and other milling parameters are selected. Also at step 402, the shape of the first arc 26, and a trial location for the first arc 26 (labeled Bo in FIG. 3), is set at Do-r, where Do-r is the distance from the first side 20 to an arbitrary point on the trial first arc 26, and where r is the radius of the milling cutter 12. The first arc 26 is generated at step 404 such that the first in-process material boundary 28 (labeled Ao in FIG. 3) corresponding to the first arc 26 is tangent to the second side 22 and to the third side 24 and intersects the first side 20. At step 406 a parameter k, for iteration of the process for establishing the final location of the first arc 26, is set to one. At step 408, the first of the second arcs 30, (labeled B1 in FIG. 3), is generated at a stepover $S_1$. At step 410, it is determined whether the in-process material boundary 32, (labeled A1 in FIG. 3), corresponding to the second arc 30, intersects the first side 20. If the in-process material boundary 32 of the second arc 30, does not intersect the first side 20, the first arc 26 is moved toward the first side 20 (step 422), by a value $S_1$, i.e., Do=Do−S1, and steps 404 through 422 are repeated until the in-process material boundary 32 of the second arc 30, intersects the first side 20.

If at step 410, the in-process material boundary 32 of the second arc 30 intersects the first side 20, the value of the stepover $S_1$ corresponding to the second arc 30, is compared with a predetermined threshold $T_1$. If at step 412, the value of the stepover $S_1$ is less than or equal to the predetermined threshold $T_1$, then the second arc 30 $B_1$ is deleted from the set at step 414. If the tool path 14 resulting from the set of arcs 26, 30 results in removing all of the desired material (step 416) from the region 10, the process 400 ends. If there is more material to be removed, the process returns to step 402 and a second set is generated.

If the value of the stepover $S_1$ is greater than the predetermined threshold $T_1$, the maximum distance D of the in-process material boundary 32 closest to the first side 20 is then compared with the value of the stepover $S_1$ at step 418. If the distance D is greater than the stepover $S_1$, the second arc 20, is acceptable, the parameter k is increased by one at step 428, and all the appropriate previous steps are repeated using corresponding values of $S_k$ until the condition D>$S_k$ at step 418 is not satisfied. At step 420, it is determined whether the distance D from the first side 20 to the maximum distance of the in-process material boundary 32 closest to the first side 20, is greater than a second predetermined value $T_2$. If the value of D is greater than or equal to the predetermined value $T_2$, the process for generating the first and second arcs 26, 30 for the first set is completed.

If the tool path 14 resulting from the set of arcs 26, 20 results in removing all of the desired material (step 424) from the region 10, the process 400 ends. If there is additional material to be removed, the process returns to step 402 and a second set is generated using the final in-process material boundary 32 of the first set as the first side 20.

If the maximum distance D of the in-process material boundary 32 closest to the first side 20 is less than the second predetermined value, the second arc 30 is discarded (step 426) and the previously generated second arc 30 is used as the final second arc 30 of the first set for generating the tool path 14 of the set. Alternatively, instead of discarding the second arc 30 that does not meet the conditions of step 416, the location of the first arc 26 may be adjusted toward the first side 20 to meet the condition of step 420. This would necessitate re-generating the first arc 26 and each successive second arc 30.

If, after discarding the second arc 20 at step 426, there is additional material to be removed, (step 424), an additional set of first and second arcs 26, 30 is generated using the final in-process material boundary 32 of the first set as the first side 20.

Using the process 400, as many sets may be generated as are required to remove the desired material from the region 10.

A computer aided manufacturing program (CAM) operative on a computer is used for generating points of the tool path 14. The points representing the tool path 14 are then operated on by a computer numerical code (CNC) program, which generates a control code for execution by a computer numerical control (NC) machine. Preferably the computer used for generating the control code is a programmable type of computer such as a personal computer. Preferably, the computer employs one or more arithmetic processor chips, a random access memory, non-volatile memory such as semiconductor read only memory, a hard disk, removable read/write memory drives such as a floppy disk drive and/or CD disk drive, a paper tape and/or a magnetic tape drive, a keyboard, a mouse, and a video display. Preferably, the computer utilizes the Microsoft Windows® software operating system.

Preferably, the control code for execution in the NC machine is transferred from the computer to the NC machine using well-known wire or wireless interface standards. Alternatively, the code may be recorded on a removable media such as a floppy disk, a CD/DVD disk, a flash memory stick, a magnetic tape or a paper tape, for transfer to the NC machine. However, the control code is not required to be generated by the aforementioned hardware and software environment. Alternatively, for example, the control code for the NC machine could be generated within the computer of the NC machine.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An automated method for generating a tool path for milling a region of a workpiece with a milling cutter, the region comprising a first side, a second side and a third side, the method comprising the steps of:

generating with a processor a first arc having a corresponding in-process material boundary which intersects the first side and which is tangent to the second side and to the third side;

generating with the processor a succession of one or more second arcs, each one of which being characterized by: (1) having a corresponding in-process material boundary which intersects the first side, (2) being parallel to the first arc, and (3) progressing by a corresponding first predetermined value from the first arc toward the first side until the in-process material boundary corresponding to one of the second arcs has a maximum distance from the first side that is less than the first predetermined value; and thereafter generating with the processor a succession of transition passes connecting each one of the second arcs, end to end, with the first arc to form the tool path.

2. The method of claim 1, wherein the first arc has a shape such that the set of all points contained within the region between the first arc and the first side form a convex set.

3. The method of claim 2, wherein the first arc is a segment of a conic.

4. The method of claim 3, wherein the first arc is a segment of a circle.

5. The method of claim 1, wherein the first predetermined value is a constant.

6. The method of claim 1, wherein the first predetermined value is selected according to a shape of each second arc.

7. The method of claim 1, wherein each corresponding first predetermined value is selected to maintain engagement of the milling cutter to be within a predetermined range for at least a portion of the succession of arcs.

8. A non-transitory computer readable storage medium having an executable program stored thereon, wherein the program instructs a computer to generate a tool path for milling a region of a workpiece with a milling cutter, the region comprising a first side, a second side and a third side, the method comprising the steps of:

generating with a processor a first arc having a corresponding in-process material boundary which intersects the first side and which is tangent to the second side and to the third side;

generating with the processor a succession of one or more second arcs, each one of which being characterized by: (1) having a corresponding in-process material boundary which intersects the first side, (2) being parallel to the first arc, and (3) progressing by a corresponding first predetermined value from the first arc toward the first side until the in-process material boundary corresponding to one of the second arcs has a maximum distance from the first side that is less than the first predetermined value; and thereafter generating with the processor a succession of transition passes connecting each one of the second arcs, end to end, with the first arc to form the tool path.

9. The non-transitory computer readable storage medium of claim 8, wherein the first arc has a shape such that the set of all points contained within the region between the first arc and the first side form a convex set.

10. The non-transitory computer readable storage medium of claim 9, wherein the first arc is a segment of a conic.

11. The non-transitory computer readable storage medium of claim 10, wherein the first arc is a segment of a circle.

12. The non-transitory computer readable storage medium of claim 8, wherein the first predetermined value is a constant.

13. The non-transitory computer readable storage medium of claim 8, wherein the first predetermined value is selected according to a shape of each second arc.

14. The non-transitory computer readable storage medium of claim 8, wherein each corresponding first predetermined value is selected to maintain engagement of the milling cutter to be within a predetermined range for at least a portion of the succession of arcs.

15. A machine for generating a tool path for milling a region of a workpiece with a milling cutter, the region comprising a first side, a second side and a third side, comprising:
   a processor coupled to a memory, wherein the processor is programmed to generate the tool path by the steps of:
   generating a first arc having a corresponding in-process material boundary which intersects the first side and which is tangent to the second side and to the third side;
   generating a succession of one or more second arcs, each one of which being characterized by: (1) having a corresponding in-process material boundary which intersects the first side, (2) being parallel to the first arc, and (3) progressing by a corresponding first predetermined value from the first arc toward the first side until the in-process material boundary corresponding to one of the second arcs has a maximum distance from the first side that is less than the first predetermined value; and thereafter
   generating a succession of transition passes connecting each one of the second arcs, end to end, with the first arc to form the tool path.

16. The machine of claim 15, wherein the first arc has a shape such that the set of all points contained within the region between the first arc and the first side form a convex set.

17. The machine of claim 16, wherein the first arc is a segment of a conic.

18. The machine of claim 17, wherein the first arc is a segment of a circle.

19. The machine of claim 15, wherein the first predetermined value is a constant.

20. The machine of claim15, wherein the first predetermined value is selected according to a shape of each second arc.

21. The machine of claim 15, wherein each corresponding first predetermined value is selected to maintain engagement of the milling cutter to be within a predetermined range for at least a portion of the succession of arcs.

* * * * *